No. 680,080. Patented Aug. 6, 1901.
J. C. SKOGVOLD.
HOLDER FOR BOOKS, NEWSPAPERS, &c.
(Application filed Oct. 4, 1900.)
(No Model.) 3 Sheets—Sheet 1.
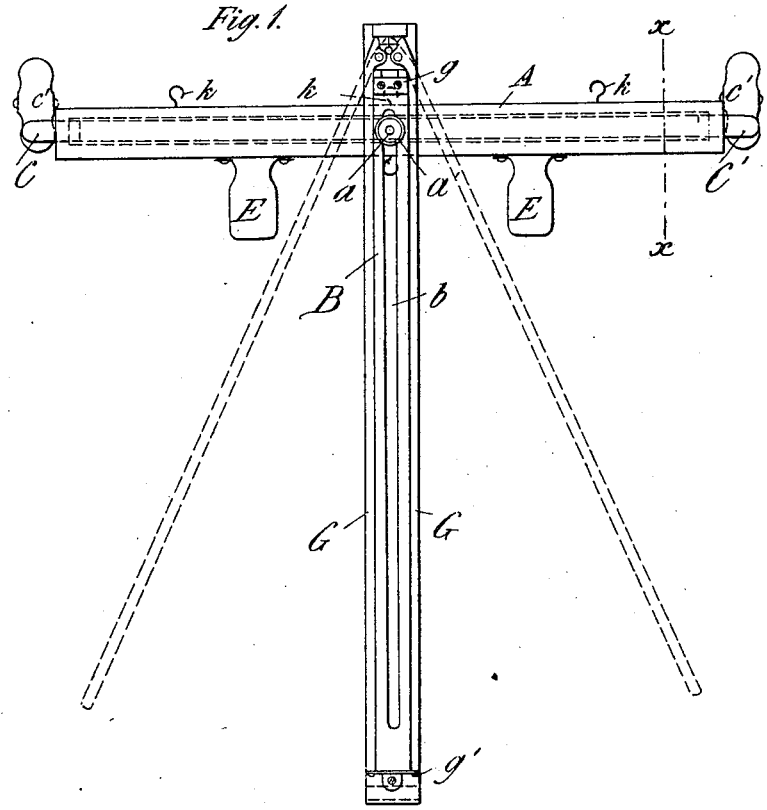
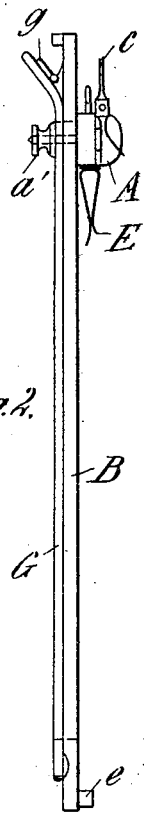
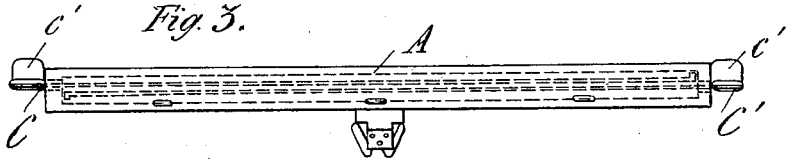
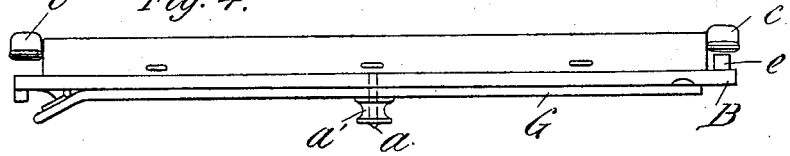

No. 680,080. Patented Aug. 6, 1901.
J. C. SKOGVOLD.
HOLDER FOR BOOKS, NEWSPAPERS, &c.
(Application filed Oct. 4, 1900.)
(No Model.) 3 Sheets—Sheet 2.
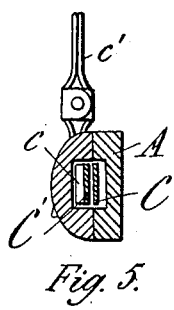
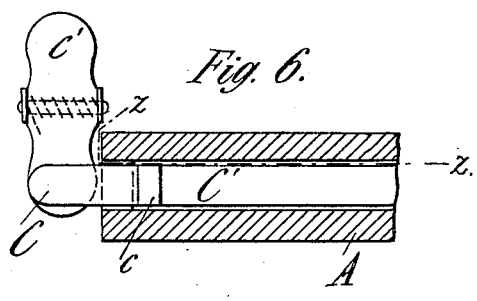
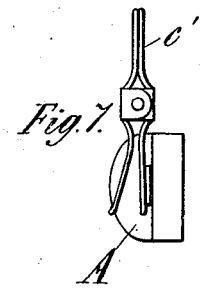
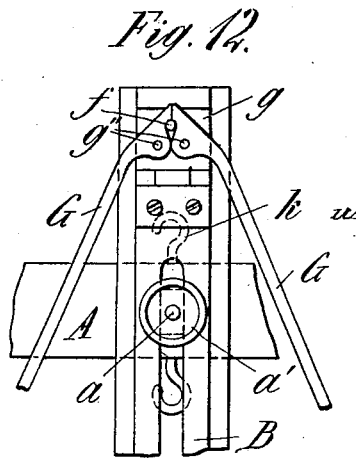
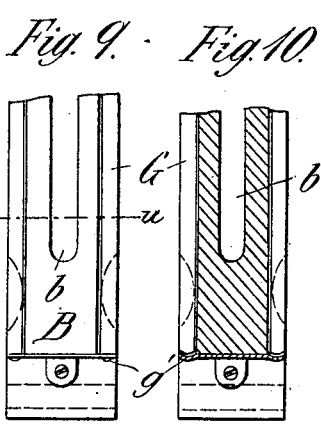
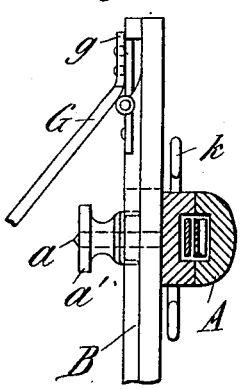
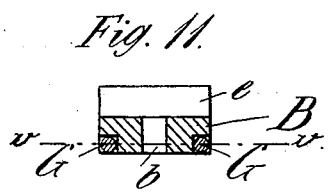
Witnesses:
J. D. McMahon.
E. Hoffman.
Inventor,
Jens Christian Skogvold
by B. Singer
Att'y.
THE NORRIS PETERS CO., PHOTO-LITHO., WASHINGTON, D. C.

No. 680,080. Patented Aug. 6, 1901.
J. C. SKOGVOLD.
HOLDER FOR BOOKS, NEWSPAPERS, &c.
(Application filed Oct. 4, 1900.)
(No Model.) 3 Sheets—Sheet 3.

Witnesses:
J. D. McMahon.
E. Hoffman.

Inventor,
Jens Christian Skogvold
by Bhinger
Att'y.

UNITED STATES PATENT OFFICE.

JENS CHRISTIAN SKOGVOLD, OF KONGSBERG, NORWAY.

HOLDER FOR BOOKS, NEWSPAPERS, &c.

SPECIFICATION forming part of Letters Patent No. 680,080, dated August 6, 1901.

Application filed October 4, 1900. Serial No. 32,045. (No model.)

*To all whom it may concern:*

Be it known that I, JENS CHRISTIAN SKOGVOLD, a citizen of the Kingdom of Norway, residing at Kongsberg, Norway, have invented certain new and useful Improvements in Holders for Books, Newspapers, and the Like, of which the following is a specification, reference being had to the accompanying drawings, forming part thereof, in which similar letters of reference indicate corresponding parts throughout all the views.

My invention relates to holders for books, newspapers, and the like; and the object thereof is to provide an improved device so constructed that it can be used either suspended by a cord or standing on a table, and it is intended specially to be employed by invalids or sick persons.

The accompanying drawings show one way in which my said invention may be carried out in practice.

Figure 14:
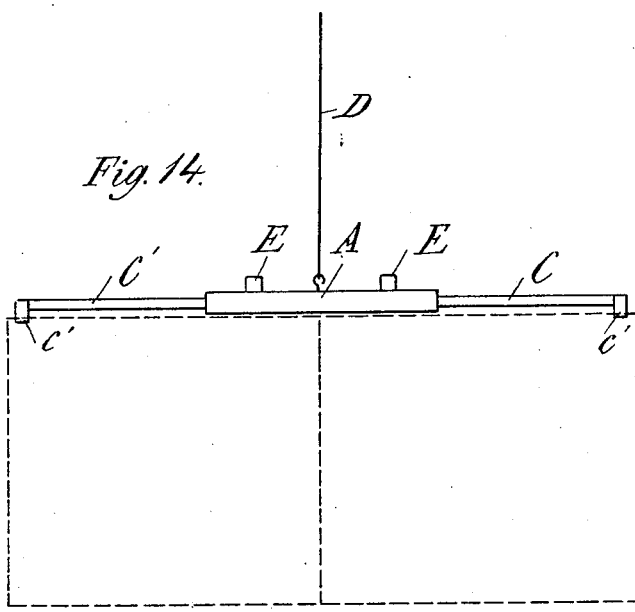
Figure 15:
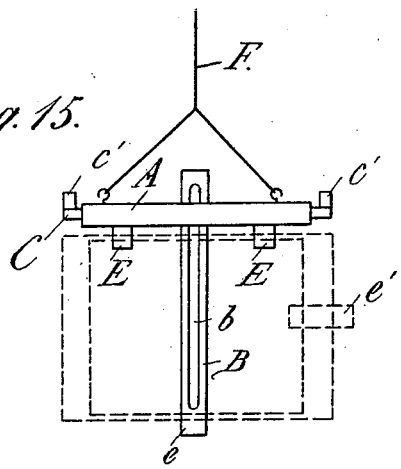

Figure 1 shows the apparatus in elevation seen from behind when in position to hold a book. Fig. 2 shows same seen from the side. Fig. 3 shows same in plan seen from above. Fig. 4 shows the apparatus folded when not used. Fig. 5 shows sectional cut through the piece A on the line $xx$ in Fig. 1. Fig. 6 shows longitudinal cut on the line $yy$ in Fig. 8. Fig. 7 shows end view of the piece A. Fig. 8 shows longitudinal cut on the line $zz$ in Fig. 6. Fig. 9 shows enlarged view of the lower part of the piece B. Fig. 10 shows longitudinal cut on the line $vv$ in Fig. 11. Fig. 11 shows transverse section on the line $uu$ in Fig. 9. Fig. 12 shows upper part of the piece B. Fig. 13 shows same seen from the side. Fig. 14 shows the apparatus suspended and holding a newspaper, shown in dotted lines. Fig. 15 shows the apparatus suspended and holding a book, shown in dotted lines.

The apparatus consists principally of the two main pieces A and B, held together by means of a screw-bolt $a$, the said screw-bolt being fixed to the piece A and passed through a longitudinal slot $b$ in the piece B, whereby the pieces A and B may be held together in any desired position by means of a nut $a'$. The piece A is hollow and provided with lengthening-bars C C', Figs. 5, 6, 7, 8, and 14, lodged in the hollow space of the said piece. The bars are furnished with stop-pieces $c$ to prevent their falling out, and on their extremities they have clasps $c'$, by which said bars are able to hold a newspaper, as shown in Fig. 14. When used to hold a newspaper, the piece B is folded along the piece A, as shown in Fig. 4. The piece A is further provided with clasps E, and the piece B has on one end on the side facing the piece A a projection $e$. By this arrangement the apparatus may be used to hold a book, (see Fig. 15,) the cover of the book being stuck into the clasps E E and the book resting with its lower edge on the projection $e$. A loose clasp $e'$ (see Fig. 15) is employed to hold the leaves of the book on the right-hand side, and this clasp should not be strong, but allow the ready turning of the leaves. The piece A is further provided with hooks $k$, to which may be attached a single cord D (see Fig. 14) or a divided cord F. (See Fig. 15.)

Although the apparatus is principally intended to be used in a suspended position, it may of course also be used as a reading-stand on a table, and for this purpose the piece B is provided on the back with legs G G, secured to the said piece by means of a hinge $g$. When not in use, the said legs rest in grooves on the side edges of the piece B and are held by a socket-piece $g'$. (See Figs. 9 and 10.)

Although I regard the construction mentioned above as being the most advantageous, I wish it to be understood that I reserve to myself the right to make such alterations as come fairly within the scope of my said invention. Thus, for instance, the lengthening-bars C C' might as well be attached outside of the piece A and secured to the same by any suitable arrangement.

Having now fully described my invention, I claim as new and desire to secure by Letters Patent—

1. The combination of the bar A, provided with clips E, the longitudinally-slotted bar B having rest or projection $e$, the screw-bolt $a$ fixed to bar A and passing through the slot in bar B, and the clamping-nut $a'$ engaging said screw-bolt, whereby said bar B may be adjusted up and down with reference to bar A, as herein described.

2. The combination of bar A, extension-bars C, C' working in said bar A, to expand its effective area, and provided with clips $c'$ at the outer ends, the longitudinally-slotted bar B, the screw-bolt $a$, fixed to bar A and passing through the slot in bar B, and the clamping-nut $a'$, whereby said bar B may be folded up alongside the bar A, as and for the purpose described.

3. The combination of the bar A, the extension-slides C, C' working therein and provided with clips $c'$ at their outer ends, the clips E depending from said bar A, the slotted bar B, the screw-bolt $a$ fixed to said bar A and passing through the slot in bar B, the clamping-nut $a'$ engaging said screw-bolt to lock bar B in adjustment relatively to bar A, and the legs G hinged to said bar B, as and for the purpose herein set forth.

In witness whereof I have hereunto set my hand in presence of two witnesses.

JENS CHRISTIAN SKOGVOLD.

Witnesses:
N. G. TANDBERG,
M. ALGER.